US012637079B2

(12) United States Patent
Gellner et al.

(10) Patent No.: US 12,637,079 B2
(45) Date of Patent: May 26, 2026

(54) CRUISE CONTROL ADJUSTMENT FOR OPTIMAL VEHICLE CORNERING

(71) Applicant: GM GLOBAL TECHNOLOGY OPERATIONS LLC, Detroit, MI (US)

(72) Inventors: Ryan Aaron Gellner, Livonia, MI (US); Tyler P. Morris, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 18/455,338

(22) Filed: Aug. 24, 2023

(65) Prior Publication Data

US 2025/0065877 A1      Feb. 27, 2025

(51) Int. Cl.
*A01B 69/00*      (2006.01)
*B60W 30/14*      (2006.01)
*B60W 30/18*      (2012.01)

(52) U.S. Cl.
CPC .... *B60W 30/18145* (2013.01); *B60W 30/143* (2013.01); *B60W 2540/18* (2013.01)

(58) Field of Classification Search
CPC ......... B60W 30/18145; B60W 30/143; B60W 2540/18; B60W 30/045; B60W 40/00; B60W 2520/14; B60W 2552/30; B60W 271/18
See application file for complete search history.

(56) References Cited

U.S. PATENT DOCUMENTS

| | | | | |
|---|---|---|---|---|
| 2013/0332044 | A1* | 12/2013 | Um | B60W 50/0097 701/93 |
| 2020/0057453 | A1* | 2/2020 | Laws | G08G 1/22 |
| 2021/0213932 | A1* | 7/2021 | Aggoune | B60W 50/0097 |
| 2022/0144268 | A1* | 5/2022 | Du | B60W 30/146 |
| 2025/0042399 | A1* | 2/2025 | Tomioka | B60W 30/162 |

* cited by examiner

*Primary Examiner* — Adam M Alharbi
(74) *Attorney, Agent, or Firm* — Ingrassia Fisher & Lorenz, LLP | IF&L

(57)      ABSTRACT

In an embodiment, a method is provided that includes obtaining sensor data via one or more sensors of a vehicle; and adjusting a speed of the vehicle during cruise control, via instructions provided by a processor of the vehicle, as the vehicle performs a cornering maneuver, the adjusting including decreasing the speed of the vehicle so as to be less than a manually inputted speed for the cruise control, during one or more first intervals of the cornering maneuver, based on the sensor data and in accordance with the instructions provided by the processor; and increasing the speed of the vehicle so as to return to the manually inputted speed for the cruise control, during one or more second intervals of the cornering maneuver that are subsequent to the one or more first intervals, based on the sensor data and in accordance with the instructions provided by the processor.

18 Claims, 4 Drawing Sheets

Figure 1:
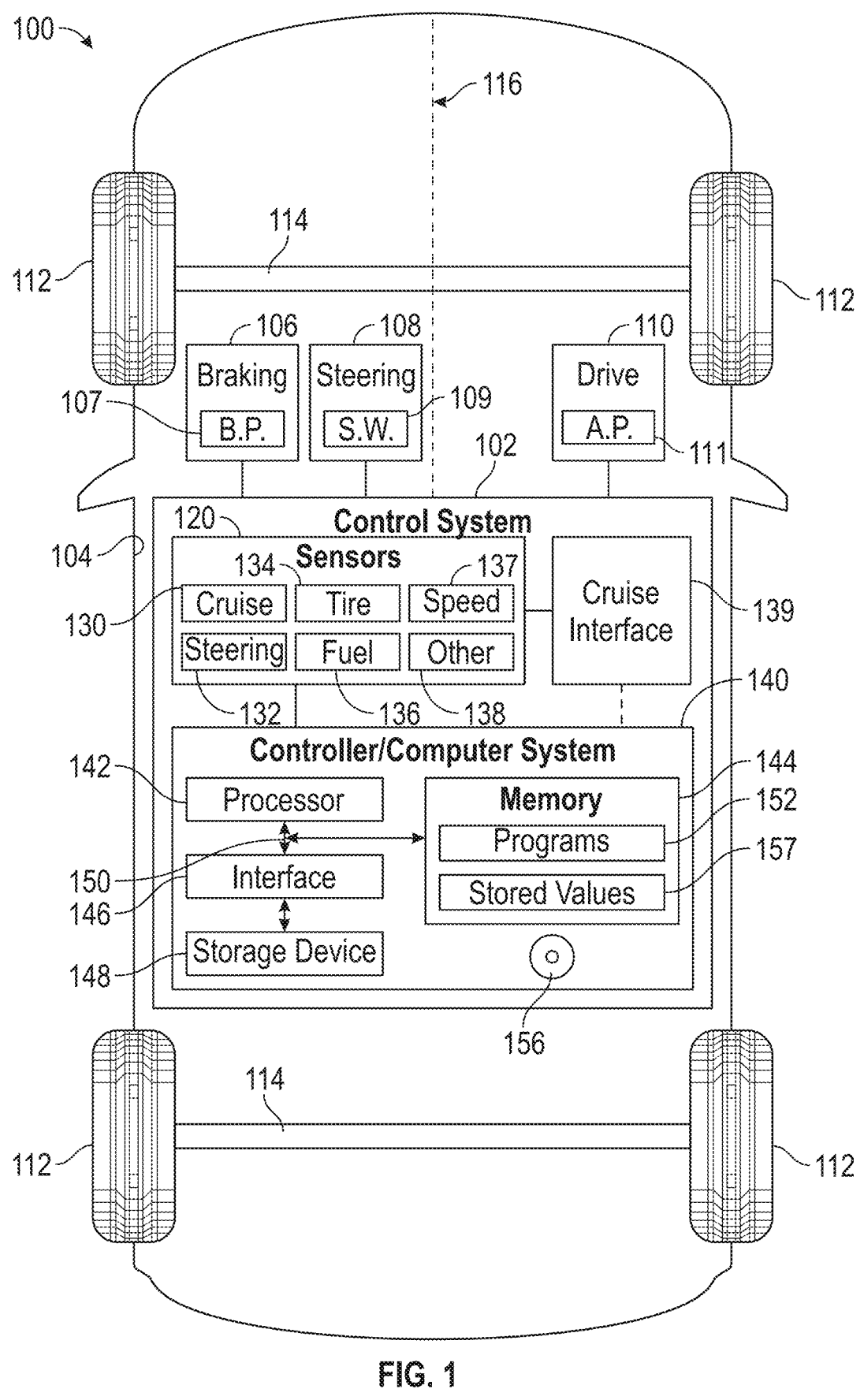

100

116

114

112          112

107

106          108          110

Braking     Steering          Drive

B.P.        S.W.    109       A.P.     111

102

104

120          Control System

134          Sensors          137

130     Cruise   Tire   Speed      Cruise
                                   Interface      139

Steering   Fuel   Other 132          136      138          140

Controller/Computer System

142     Processor                 Memory          144
                                                  152
                                  Programs
150                                               157
146     Interface                 Stored Values 148     Storage Device

CRUISE CONTROL ADJUSTMENT FOR OPTIMAL VEHICLE CORNERING

INTRODUCTION

The technical field generally relates to vehicles and, more specifically, to methods and systems for controlling cruise control functionality for a vehicle while the vehicle is performing a cornering maneuver.

Certain vehicles today have cruise control functionality, in which the vehicle automatically maintains a preset speed that is inputted by the driver. However, existing vehicles may not always provide for optimal speed adjustments when a vehicle is performing a cornering maneuver.

Accordingly, it is desirable to provide improved methods and systems for controlling cruise control functionality for a vehicle, including when the vehicle is performing a cornering maneuver. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes obtaining sensor data via one or more sensors of a vehicle; and adjusting a speed of the vehicle during cruise control by adjusting a cruise control speed setting, by braking, or both, via instructions provided by a processor of the vehicle, as the vehicle performs a cornering maneuver, the adjusting including decreasing the speed of the vehicle so as to be less than a manually inputted speed for the cruise control, during one or more first intervals of the cornering maneuver, based on the sensor data and in accordance with the instructions provided by the processor; and increasing the speed of the vehicle so as to return to the manually inputted speed for the cruise control, during one or more second intervals of the cornering maneuver that are subsequent to the one or more first intervals, based on the sensor data and in accordance with the instructions provided by the processor.

Also in an exemplary embodiment, the decreasing of the speed of the vehicle terminates and the increasing of the speed of the vehicle begins when a user of the vehicle begins to steer out of the cornering maneuver.

Also in an exemplary embodiment, the sensor data includes steering angle data as to a steering angle of the vehicle; and the decreasing of the speed of the vehicle and the subsequent increasing of the speed during the cornering maneuver are performed based on the steering angle in addition to a steering rate that includes a rate of change of the steering angle over time.

Also in an exemplary embodiment, the decreasing of the speed of the vehicle is performed when the steering rate is within a predetermined steering rate range and the steering angle is greater than a predetermined steering angle threshold, provided further that the cruise control is active for the vehicle.

Also in an exemplary embodiment, the increasing of the speed is performed when one or more of the following conditions are satisfied: (a) the steering rate is no longer within the predetermined steering rate range: or (b) the steering angle is no longer greater than the predetermined steering angle threshold.

Also in an exemplary embodiment, the decreasing of the speed of the vehicle is performed when the steering rate is greater than a first predetermined steering rate threshold and less than a second predetermined threshold, while the steering angle is greater than the predetermined steering angle threshold and the cruise control is active for the vehicle.

Also in an exemplary embodiment, the decreasing of the speed of the vehicle is performed upon an additional condition in which the speed of the vehicle is greater than a predetermined speed threshold.

Also in an exemplary embodiment, the decreasing of the speed of the vehicle is performed based upon a lateral acceleration or comfort score that are determined using the steering angle and the steering rate.

Also in an exemplary embodiment, the lateral acceleration or comfort score are also determined using one or more additional conditions that include a tire pressure of one or more tires of the vehicle, a fuel level for the vehicle, or both.

In another exemplary embodiment, a system is provided that includes one or more sensors and a processor. The one or more sensors are configured to obtain sensor data as to a vehicle. The processor is coupled to the one or more sensors, and is configured to at least facilitate adjusting a speed of the vehicle during cruise control by adjusting a cruise control speed setting, by braking, or both as the vehicle performs a cornering maneuver, the adjusting including decreasing the speed of the vehicle so as to be less than a manually inputted speed for the cruise control, during one or more first intervals of the cornering maneuver; and increasing the speed of the vehicle so as to return to the manually inputted speed for the cruise control, during one or more second intervals of the cornering maneuver that are subsequent to the one or more first intervals, based on the sensor data.

Also in an exemplary embodiment, the processor is further configured to at least facilitate terminating the decreasing of the speed and beginning the increasing of the speed of the vehicle when a user of the vehicle begins to steer out of the cornering maneuver.

Also in an exemplary embodiment, the one or more sensors include one or more steering angle sensors that are configured to obtain steering angle data as to a steering angle of the vehicle; and the processor is further configured to at least facilitate performing the decreasing of the speed of the vehicle and the subsequent increasing of the speed during the cornering maneuver based on the steering angle in addition to a steering rate that includes a rate of change of the steering angle over time.

Also in an exemplary embodiment, the processor is further configured to at least facilitate performing the decreasing of the speed of the vehicle when the steering rate is within a predetermined steering rate range and the steering angle is greater than a predetermined steering angle threshold, provided further that the cruise control is active for the vehicle.

Also in an exemplary embodiment, the processor is further configured to at least facilitate performing the increasing of the speed when one or more of the following conditions are satisfied: (a) the steering rate is no longer within the predetermined steering rate range: or (b) the steering angle is no longer greater than the predetermined steering angle threshold.

Also in an exemplary embodiment, the processor is further configured to at least facilitate performing the decreasing of the speed when the steering rate is greater than a first predetermined steering rate threshold and less than a second predetermined threshold, while the steering angle is greater than the predetermined steering angle threshold and the cruise control is active for the vehicle.

Also in an exemplary embodiment, the one or more sensors further include one or more speed sensors that are configured to obtain speed data as to the speed of the vehicle; and the processor is further configured to at least facilitate performing the decreasing of the speed of the vehicle upon an additional condition in which the speed of the vehicle is greater than a predetermined speed threshold.

Also in an exemplary embodiment, the processor is further configured to at least facilitate the decreasing of the speed of the vehicle based upon a lateral acceleration or comfort score that are determined by the processor using the steering angle and the steering rate.

Also in an exemplary embodiment, the one or more sensors further comprise one or more tire pressure sensors that are configured to obtain tire pressure data as to a pressure of one or more tires of the vehicle, one or more fuel level sensors that are configured to obtain fuel level data as to a fuel level for the vehicle, or both; and the processor is further configured to at least facilitate determining the lateral acceleration or comfort score also using one or more additional conditions that include the tire pressure of one or more tires of the vehicle, the fuel level for the vehicle, or both.

In another exemplary embodiment, a vehicle is provided that includes a braking system, a drive system, and a control system for controlling cruise control for the vehicle. The control system includes one or more sensors and a processor. The one or more sensors are configured to obtain sensor data as to the vehicle. The processor is coupled to the one or more sensors, and is configured to at least facilitate adjusting a speed of the vehicle during the cruise control by adjusting a cruise control speed setting, by braking, or both as the vehicle performs a cornering maneuver in accordance with instructions provided to the braking system and the drive system, the adjusting including decreasing the speed of the vehicle so as to be less than a manually inputted speed for the cruise control, during one or more first intervals of the cornering maneuver; and increasing the speed of the vehicle so as to return to the manually inputted speed for the cruise control, during one or more second intervals of the cornering maneuver that are subsequent to the one or more first intervals, based on the sensor data.

Also in an exemplary embodiment, the one or more sensors include one or more steering angle sensors that are configured to obtain steering angle data as to a steering angle of the vehicle; and the processor is further configured to at least facilitate performing the decreasing of the speed of the vehicle and the subsequent increasing of the speed during the cornering maneuver based on the steering angle in addition to a steering rate that includes a rate of change of the steering angle over time.

DESCRIPTION OF THE DRAWINGS

The present disclosure will hereinafter be described in conjunction with the following drawing figures, wherein like numerals denote like elements, and wherein:

FIG. 1 is a functional block diagram of a vehicle that includes a control system for controlling cruise control functionality for the vehicle, including when the vehicle is performing a cornering maneuver, in accordance with exemplary embodiments;

DETAILED DESCRIPTION

Figure 2:
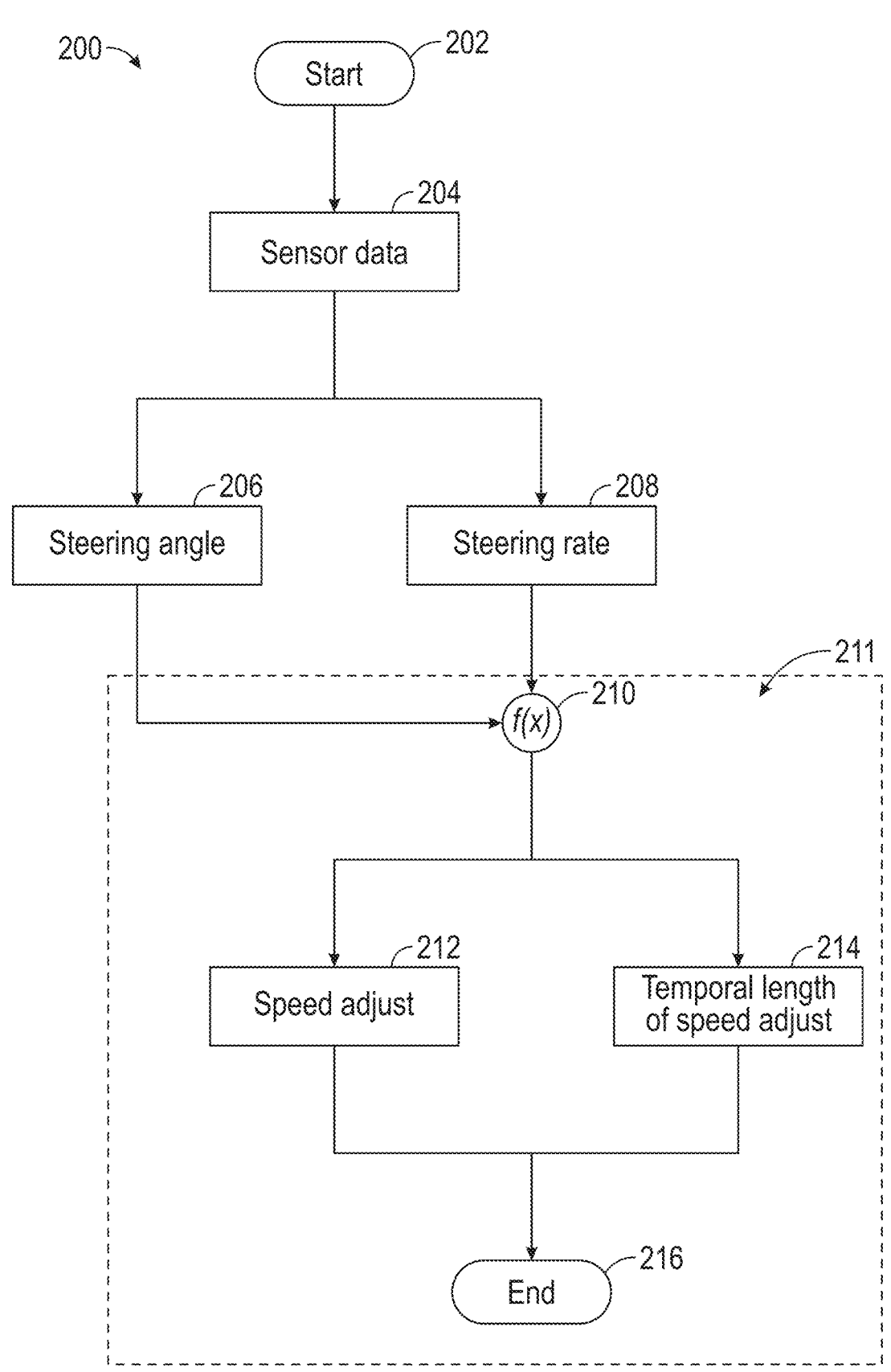
FIG. 2 is a flowchart of process for controlling cruise control functionality for the vehicle, including when the vehicle is performing a cornering maneuver, in accordance with exemplary embodiments, and that can be implemented in connection with the vehicle of FIG. 1, including the control system and other components thereof.

The following detailed description is merely exemplary in nature and is not intended to limit the disclosure or the application and uses thereof. Furthermore, there is no intention to be bound by any theory presented in the preceding background or the following detailed description.

FIG. 1 illustrates a vehicle 100, according to an exemplary embodiment. As described in greater detail further below, the vehicle 100 includes a control system 102 that is configured for controlling cruise control functionality for the vehicle, including with the implementation of speed adjustments when the vehicle is performing a cornering maneuver, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 includes or is coupled to an accelerator pedal 111 which receives inputs from a driver of the vehicle 100. In certain embodiments, the drive system 110 is controlled at various times based on the driver inputs and/or automatically via the control system 102 (e.g., during cruise control and/or other automated functionality).

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver, such as a brake pedal 107 as depicted in FIG. 1, and/or automatically via the control system 102 (e.g., during cruise control and/or other automated functionality). Also in exemplary embodiments, the steering system 108 controls steering of the vehicle 100 via steering components, such as a steering wheel 109 as depicted in FIG. 1 (e.g., in connection with a steering column coupled to the axles 114 and/or the wheels 112) that are controlled via inputs provided by a driver (e.g., via the steering wheel), and/or automatically via the control system 102 (e.g., during cruise control and/or other automated functionality).

In the embodiment depicted in FIG. 1, the control system 102 is coupled to the drive system 110, the braking system 106, and the steering system 108, and controls cruise control functionality for the vehicle 100. In certain embodiments, the control system 102 controls, among other vehicle functionality, cruise control functionality for the vehicle 100, including during cornering. Also as depicted in FIG. 1, in various embodiments, the control system 102 includes a sensor array 120, a cruise control interface 139, and a controller 140.

In various embodiments, the sensor array 120 includes various sensors that obtain sensor data for use in controlling, among other functionality, cruise control functionality for the vehicle 100, including during cornering. In the depicted embodiment, the sensor array 120 includes one or more cruise control input sensors 130, steering sensors 132, tire sensors 134, fuel sensors 136, and speed sensors 137. In certain embodiments, the sensor array 120 may also include other sensors 138.

In certain embodiments, the cruise control input sensors 130 receive user inputs (e.g., from a driver of the vehicle 100) as to activation and deactivation of cruise control functionality for the vehicle 100, and for a speed setting for the cruise control when it is implemented. For example, in various embodiments, the driver presses a button, engages a knob or other device, provides an input via a touch screen, or the like, as to when the driver wishes to use cruise control, along with a speed setting for the cruise control when it is being used. In various embodiments, the cruise control input sensors 130 capture these user inputs.

Also in certain embodiments, the steering sensors 132 capture a steering angle for the vehicle 100 and changes thereof. In various embodiments, the steering sensors 132 comprise one or more steering angle sensors that are part of or coupled to the steering wheel 109, the steering system 108, and/or one or more components thereof.

Also in certain embodiments, the tire sensors 134 capture sensor data regarding one or more tires of the vehicle 100. In various embodiments, the tire sensors 134 comprise one or more tire pressure sensors that are coupled to and obtain data as to tire pressures of the tires.

Also in certain embodiments, the fuel sensors 136 capture sensor data as to a fuel level of the vehicle 100. In various embodiments, the fuel sensors 136 comprise one or more fuel tank sensors that are part of or coupled to a fuel tank of the vehicle 100.

Also in certain embodiments, the speed sensors 137 capture sensor data as to a speed of the vehicle 100. In various embodiments, the speed sensors 137 comprise one or more wheel speed sensors coupled to one or more wheels 112 of the vehicle 100, and/or one or more other types of speed sensors.

Also in certain embodiments, other sensors 138 may include, by way of example, one or more other user input sensors (e.g., for obtaining user inputs as to the brake pedal 107, accelerator pedal 111, and/or other user inputs), and/or one or more other sensors configured to obtain other vehicle data (e.g., one or more cameras, accelerometers, and so on).

In various embodiments, the cruise control interface 139 facilitates the driver's interaction with the cruise control functionality for the vehicle 100. For example, in various embodiments, the cruise control interface may include one or more knobs, buttons, display screens, or the like that enable the driver to activate and deactivate the cruise control functionality as well as to manually set a speed for the cruise control while it is in use, and so on.

Figure 3:
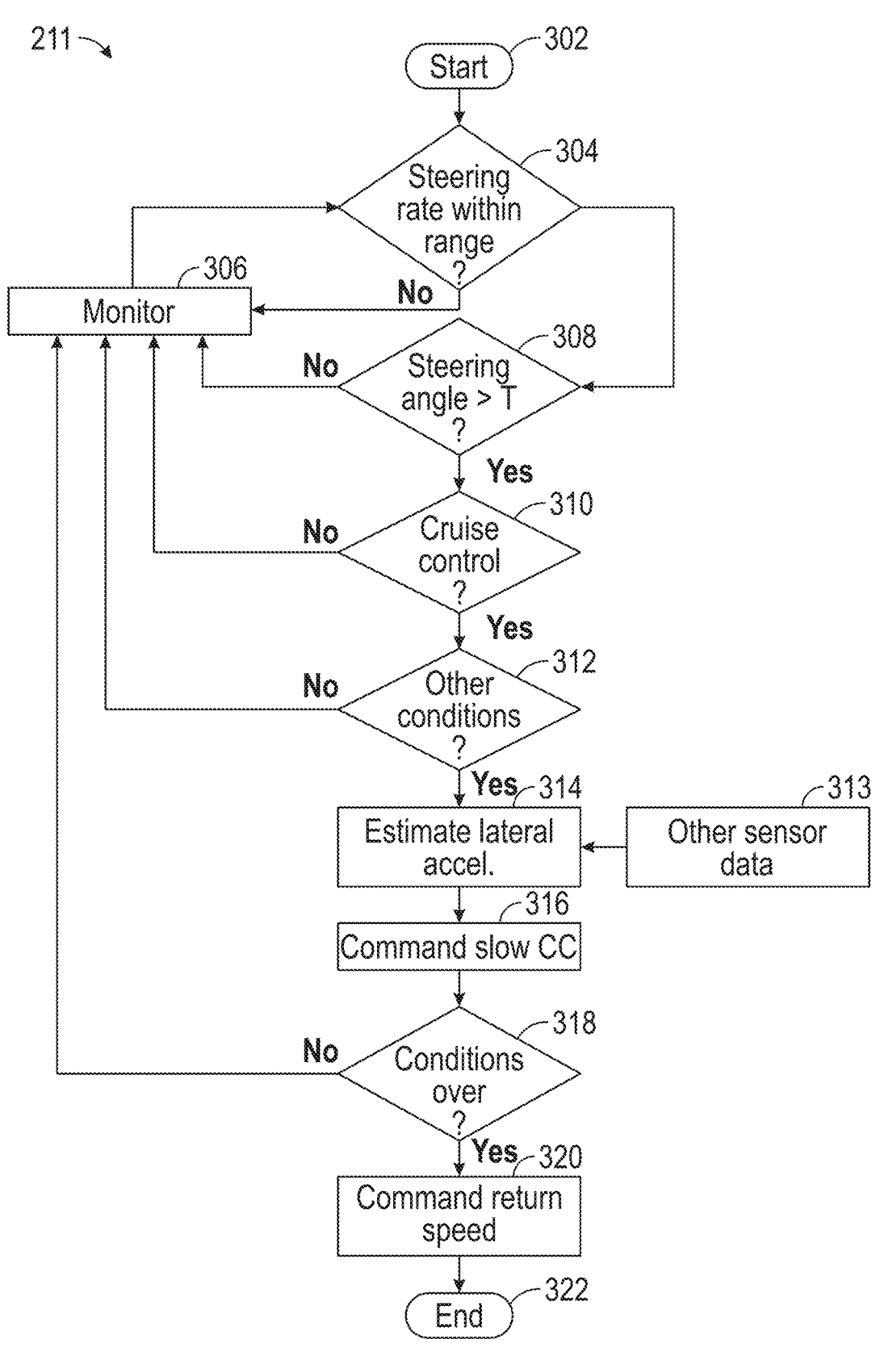
FIG. 3 is a flowchart of a step or subprocess of FIG. 2, namely for cruise control adjustment via a speed adjustment algorithm based on steering angle, steering rate, and other parameters, in accordance with exemplary embodiments.
Figure 4:
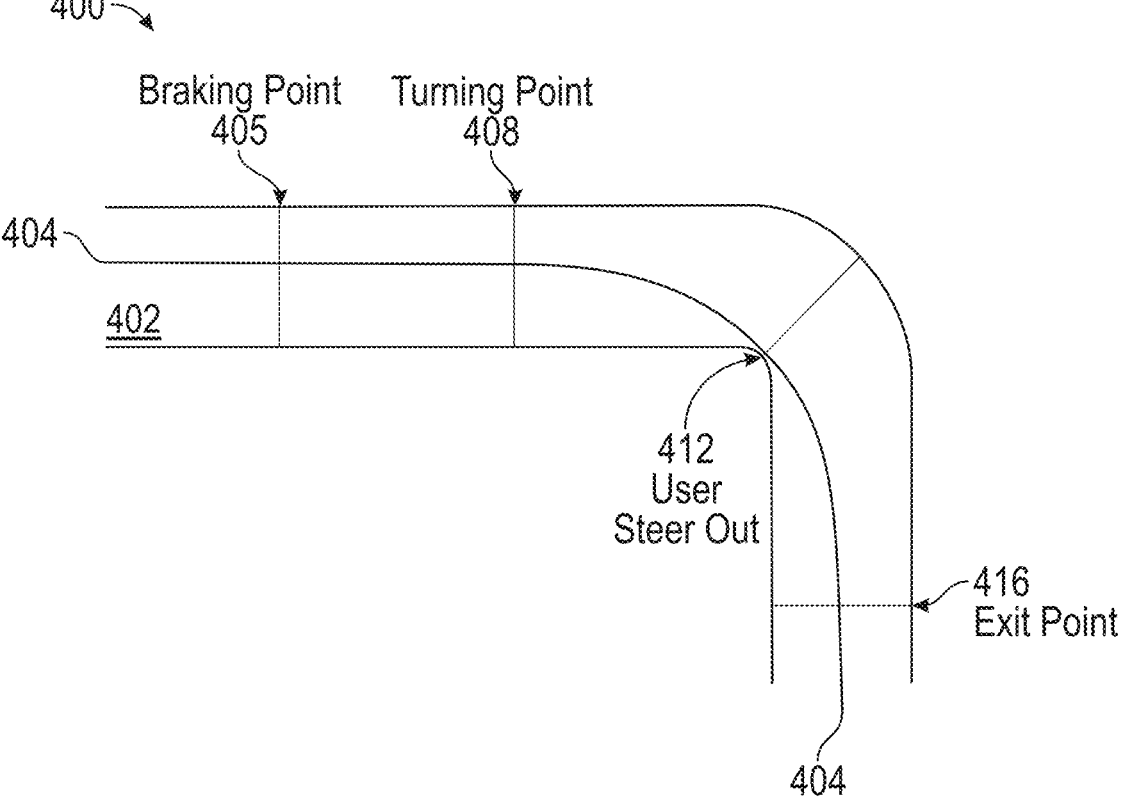
FIG. 4 depicts an exemplary implementation of the system of FIG. 1 and the process of FIGS. 2 and 3, in which the speed of the vehicle is illustrated as the vehicle performs a concerning maneuver, in accordance with exemplary embodiments.

In various embodiments, the controller 140 is coupled to the sensor array 120 and receives sensor data therefrom. In various embodiments, the controller 140 is further coupled to the cruise control interface 139 and to the drive system 110, braking system 106, steering system 108, and other vehicle components. In various embodiments, the controller 140 controls automatic functionality for the vehicle 100, including cruise control functionality, and including while the vehicle 100 is undertaking a cornering maneuver. Specifically, as depicted in FIGS. 2-4 and described in greater detail further below, in various embodiments the controller 140 adjusts the speed of the vehicle 100 in a predefined manner while the vehicle 100 is cornering, including an initial reduction of speed followed by a subsequent increase in speed as the vehicle 100 is performing a cornering maneuver.

In various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls vehicle operation, including controlling automated vehicle functionality and detection of driver spoofing with respect to such automated functionality, among other vehicle control functions. In various embodiments, the controller 140 provides these and other functions in accordance with the steps of the process 200 of FIGS. 2 and 3 and the implementation of FIG. 4, for example in connection with controlling the cruise control functionality for the vehicle 100, including during cornering.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIGS. 2 and 3 and the implementation of FIG. 4 and described further below in connection therewith.

The memory 144 can be any type of suitable memory, including various types of non-transitory computer readable storage medium. In certain examples, the memory 144 is located on and/or co-located on the same computer chip as the processor 142. In the depicted embodiment, the memory 144 stores the above-referenced program 152 along with stored values 157 (e.g., look-up tables, thresholds, and/or other values with respect to control of cruise control for the vehicle 100).

The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIGS. 2 and 3 and the implementations of FIG. 4 and described further below in connection therewith. In another exemplary embodiment, the program product may be directly stored in and/or otherwise accessed by the memory 144 and/or a disk (e.g., disk 156), such as that referenced below.

The bus 150 serves to transmit programs, data, status and other information or signals between the various components of the computer system of the controller 140. The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program.

FIG. 2 is a flowchart of process 200 for controlling cruise control functionality for a vehicle, including when the vehicle is performing a cornering maneuver, in accordance with exemplary embodiments. In various embodiments, the process 200 can be implemented in connection with the vehicle 100 of FIG. 1, including the control system 102 and other components thereof:

As depicted in FIG. 2, the process 200 begins at step 202. In one embodiment, the process 200 begins when the vehicle 100 is operated, for example during a current vehicle drive. In certain embodiments, the process 200 may also begin when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 200 are performed continuously during operation of the vehicle 100.

Sensor data is obtained at step 204. In various embodiments, sensor data pertaining to the vehicle is obtained via each of the sensors of the vehicle's sensor array 120 of FIG. 1. In certain embodiments, the sensor data of step 204 includes sensor as to cruise control inputs from the driver (including activation of cruise control, a speed setting for the cruise control, and so on), a steering angle of the vehicle 100 (and changes thereof), tire pressure of tires of the vehicle 100, a fuel level of a fuel tank for the vehicle, a speed of the vehicle, and in certain embodiments other vehicle parameters pertaining to user inputs and/or operation of the vehicle 100.

In various embodiments, a steering rate is determined (step 206). In various embodiments, the steering rate of the vehicle 100 comprises a rate of change of the steering angle of the vehicle 100 over time. Also in various embodiments, the steering rate is determined via the processor 142 of FIG. 1 from the sensor data of step 204, based on a rate of change of the steering angle over a period of time (e.g., over a fraction of a second to over few seconds, in certain embodiments).

In various embodiments, the sensor data is supplied to a speed adjustment algorithm or function (step 210). In various embodiments, the steering angle and the steering rate (and in certain embodiments, other parameters of or derived from the sensor data) are utilized as inputs for the speed adjustment algorithm for the adjustment of the speed of the vehicle 100 during cruise control operation, including while the vehicle 100 is performing a cornering maneuver (e.g., while the vehicle 100 is making a turn, or rounding a corner of a curved roadway, or the like).

In various embodiments, during the cornering maneuver, the speed of the vehicle 100 is initially reduced in order to maintain a constant (or nearly constant) lateral acceleration or maintain or optimize comfort score for the vehicle 100 or the driver, respectively. Also in various embodiments, the speed of the vehicle 100 is subsequently increased, for example when a user of the vehicle 100 begins to steer out of the cornering maneuver. In various embodiments, the speed adjustments are made automatically in accordance with instructions provided by the processor 142 to one or more vehicle systems, such as the drive system 110 and/or the braking system 106 of FIG. 1. In certain embodiments, automatic steering may also be applied in certain circumstances via the steering system 108: however, this may vary in other embodiments.

In various embodiments, the automatic control of the vehicle 100 includes both a speed adjustment 212 and a temporal length 214 of the speed adjustment. In various embodiments, the speed adjustment is made in accordance with the temporal length, via instructions provided by the processor 142 utilizing the speed adjustment algorithm or function of step 210.

As depicted in FIG. 1, in certain embodiments 210, 212, and 214 may be collectively referred to as a combined step 211 for cruise control adjustment via the speed adjustment algorithm. In accordance with an exemplary embodiment, the combined step 211 is illustrated in greater detail in FIG. 3 and will be described in greater detail further below in connection therewith.

In various embodiments, the process then terminates at step 216.

With respect to FIG. 4, an exemplary implementation is provided for the process 200 (including the combined step 211 thereof). As depicted in FIG. 4, an exemplary illustration 400 depicts a representation of the speed 404 of the vehicle 100 as it proceeds through a cornering maneuver during a turn on a roadway. As depicted in FIG. 4, in certain embodiments, reduction of vehicle speed 404 begins at a point 405 as the vehicle 100 approaches the turn. In various embodiments, point 405 represents a braking point for the vehicle 100 (i.e., in accordance with instructions provided by the processor 142).

Also as depicted in FIG. 4, in various embodiments, the speed of the vehicle 100 is automatically reduced after the vehicle 100 passes point 405, and as the vehicle 100 passes through a turning point 408, and until the vehicle 100 reaches a point 412 when a user of the vehicle 100 begins to steer out of the cornering maneuver. As illustrated in FIG. 4, in certain embodiments point 412 may correspond to an apex of the cornering maneuver (i.e., of the turn). In various embodiments, during these time periods, the speed of the vehicle 100 is automatically decreased by adjusting the cruise control speed setting of the vehicle 100, or by braking of the vehicle 100, or both.

Next, in various embodiments, after the vehicle 100 reaches the point 412 when a user begins to steer the vehicle 100 out of the cornering maneuver (e.g., of the turn), the vehicle speed 404 is increased. In various embodiments, the speed of the vehicle 100 is automatically increased by adjusting the cruise control speed setting of the vehicle 100, and/or by decreasing braking of the vehicle 100 and/or otherwise increasing propulsion of the vehicle 100. Also in various embodiments, this continues until an exit point 416 for the turn, after which the vehicle speed 404 is automatically further increased to its pre-turn level (i.e., to the speed level set by the driver for the cruise control) in accordance with instructions provided by the processor 142.

With reference now to FIG. 3, a flowchart of combined step 211 from the process 200 of FIG. 2, namely for cruise control adjustment via a speed adjustment algorithm based on steering angle, steering rate, and other parameters, in accordance with exemplary embodiments.

As depicted in FIG. 3, in an exemplary embodiment, the combined step 211 begins at step 302.

In various embodiments, a determination is made as to whether the steering rate is within a predetermined range (step 304). In various embodiments, a processor (such as the processor 142 of FIG. 1) determines whether the steering rate of the vehicle 100 is simultaneously greater than a first predetermined steering rate threshold and less than a second predetermined steering rate threshold. In various embodiments, the second predetermined steering rate threshold is greater than the first predetermined steering rate threshold. In various embodiments, these determinations are made by the processor 142 of FIG. 1 based on the sensor data.

In various embodiments, the first predetermined steering rate threshold represents (for steering rates above this value) that the vehicle is making a turn. Also in various embodiments, the second predetermined steering rate threshold represents (for steering rates below this value) that the vehicle 100 is making an actual turn as opposed to merely swerving (e.g., around a pothole, or vehicle, or other object, or the like). For example, in one exemplary embodiment, the first predetermined steering rate threshold is approximately equal to two and a half degrees per second (2.5°/sec), whereas the second predetermined steering rate threshold is approximately equal to twenty degrees per second (20°/sec). However, these values may vary in different embodiments. In various embodiments, these thresholds are stored in, and retrieved from, the memory 144 of FIG. 1 as stored values 157 therein.

In various embodiments, if it is determined that the steering rate is not within the predetermined range, then the process proceeds to step 306. During step 306, the steering rate continues to be monitored via the processor 142, using updated sensor data. In various embodiments, steps 304 and step 306 then repeat in various iterations until a determination is made in an iteration of step 304 that the steering rate is within the predetermined range.

In various embodiments, once the steering rate is determined to be within the predetermined range, the process proceeds to step 308. In various embodiments, during step 308, a determination is made as to whether the steering angle of the vehicle 100 (from the sensor data) is greater than a predetermined steering angle threshold. In various embodiments, this determination is made by the processor 142 of FIG. 1 based on the sensor data.

In various embodiments, the predetermined steering angle threshold represents (for steering angles above this value) that the vehicle is making a turn. For example, in one exemplary embodiment, the predetermined steering angle threshold is approximately equal to five degrees: however, this may vary in different embodiments. In various embodiments, this threshold is stored in, and retrieved from, the memory 144 of FIG. 1 as a stored value 157 therein.

In various embodiments, if it is determined that the steering angle is not greater than the predetermined steering angle threshold, then the process proceeds to the above-referenced step 306, in which the steering angle (along with the steering rate, as described above) continues to be monitored via the processor 142, using updated sensor data. In various embodiments, steps 304-308 then repeat in various iterations until a determination is made in an iteration of step 308 that the steering angle is greater than the predetermined steering angle threshold.

In various embodiments, once the steering angle is determined to be greater than the predetermined steering angle threshold, the process proceeds to step 310. In various embodiments, during step 310, a determination is made as to whether cruise control is active. In various embodiments, this determination is made by the processor 142 of FIG. 1 based on the sensor data, including for example based on sensor data reflecting inputs from the driver for initiating an active cruise control session for the vehicle 100.

In various embodiments, if it is determined that cruise control is not active, then the process proceeds to the above-referenced step 306, in which the cruise control status (along with the steering rate and steering angle, as described above) continues to be monitored via the processor 142, using updated sensor data. In various embodiments, steps 304-310 then repeat in various iterations until a determination is made in an iteration of step 310 that the cruise control is active.

In various embodiments, once it is determined that cruise control is active, the process proceeds to step 312. In various embodiments, during step 312, a determination is made as to whether one or more additional conditions are satisfied for cruise control adaptation for a cornering maneuver. In various embodiments, this determination is made by the processor 142 of FIG. 1 based on the sensor data, including for example based on sensor data reflecting a speed of the vehicle 100, among other possible parameters.

For example, in certain embodiments, the one or more additional conditions may comprise a speed of the vehicle 100 being greater than a predetermined speed threshold. For example, in certain embodiments, an additional condition may comprise the speed of the vehicle 100 being greater than approximately fifty miles per hour (50 mph): however, this may vary in other embodiments.

In various embodiments, if it is determined that the one or more additional conditions are not satisfied, then the process proceeds to the above-referenced step 306, in which further monitoring is performed as to the additional conditions (along with the cruise control status and the steering rate and steering angle, as described above) via the processor 142, using updated sensor data. In various embodiments, steps 304-312 then repeat in various iterations until a determination is made in an iteration of step 312 that each of the additional conditions are satisfied.

In various embodiments, once it is determined that each of the additional conditions are satisfied (along with the other conditions described above), the process proceeds to step 314. In various embodiments, during step 314, a determination is made as to a lateral acceleration for the vehicle 100. In addition, in certain embodiments, a comfort score is also determined for the vehicle 100 that is based at least in part on the lateral acceleration. In various embodiments, these determinations are made via the processor 142 of FIG. 1 based on known vehicle characteristics (e.g., size, weight, and so on, as stored in the memory 144 as stored values 157 therein) along with current sensor states of the various parameters (including without limitation the steering angle and the steering rate).

In certain embodiments, the determinations of step 314 also utilize other sensor data 313. For example, in certain embodiments, the processor 142 determines the lateral acceleration or comfort score (or both) based not only on the above-described parame4ters (including the steering angle, the steering rate, and known vehicle characteristics) but also on additional sensor data 313 that may include a tire pressure of one or more tires of the vehicle 100, a fuel level of a fuel tank of the vehicle 100, and/or other sensor values.

In various embodiments, vehicle speed is reduced (step 316). Specifically, in various embodiments, the processor 142 automatically reduces the speed of the vehicle 100 in accordance with instructions provided to the drive system 110 and/or braking system 106 of the vehicle 100 to account for the cornering maneuver (e.g., turn) that the vehicle 100 is undertaking.

In various embodiments, during step 316, the speed of the vehicle 100 is reduced below the cruise control setting that was set by the driver. In various embodiments, the speed of the vehicle 100 is reduced by adjusting a cruise control speed setting of the vehicle 100, by braking of the vehicle 100, or both. Also in various embodiments, the speed is reduced by a certain magnitude and amount of time that is based at least in part on the lateral acceleration and/or comfort score determined in step 314. In certain embodiments, the speed is automatically reduced by an amount that will keep the lateral acceleration below a predetermined threshold during the turn, and/or that optimizes or keeps the comfort score at a predetermined level during the turn.

With reference to FIG. 4, in various embodiments, during step 316, the speed 404 of the vehicle 100 is automatically reduced after the vehicle 100 reaches the braking point 405 of FIG. 4, and is further reduced after the vehicle 100 reaches the turning point 408 of FIG. 4. In various embodiments, the automatic reduction in the speed of the vehicle 100 is accomplished by automatically adjusting the cruise control speed setting for the vehicle 100, or via braking of the vehicle 100, or both.

With reference back to FIG. 3, in various embodiments a determination is made during step 318 as to whether the conditions for reduced vehicle speed are no longer satisfied. Specifically, in various embodiments, a determination is made as to whether one or more of the conditions of steps 304, 308, 310, and/or 312 are no longer satisfied. For example, in certain embodiments, the conditions for reduced vehicle speed are no longer satisfied if the steering rate is no longer within the predetermined range of step 304, the steering angle is no longer greater than the predetermined speed threshold of step 308, the cruise control is no longer active as determined in step 310 (e.g., if the driver turns off cruise control), the one or more other conditions of step 312 are no longer satisfied, and/or any combination thereof. In certain embodiments, these determinations are made by the processor 142 of FIG. 1.

In various embodiments, if it is determined in step 318 that the conditions for reduced vehicle speed remain satisfied, then the process returns to the above-referenced step 306, in which further monitoring is performed as to the various conditions via the processor 142, using updated sensor data. In various embodiments, steps 304-318 then repeat in various iterations until a determination is made in an iteration of step 318 that one or more of the conditions for reduced vehicle speed are no longer satisfied.

In various embodiments, once it is determined that one or more of the conditions for reduced vehicle speed are no longer satisfied, the process proceeds to step 320. In various embodiments, during step 320, the speed of the vehicle 100 is automatically increased. Specifically, in various embodiments, the speed of the vehicle 100 is gradually increased so as to return to the cruise control setting that was set by the driver. Also in various embodiments, the speed is returned to this value by instructions that are provided by the processor 142 to the drive system 110 and/or braking system 106 of the vehicle 100.

In various embodiments, the vehicle speed is automatically, gradually increased by a certain constant (or approximately constant) amount of speed per period of time in this manner until the vehicle speed returns to the cruise control setting that was previously manually inputted by the driver. For example, in one embodiment, the vehicle speed is increased by approximately two miles per hour (2 mph) per second until it reaches the user-inputted cruise control setting: however, this rate may vary in other embodiments.

With reference to FIG. 4, in various embodiments, during step 320 the speed 404 of the vehicle 100 is automatically increased during interval 414 of FIG. 4. For example, in certain embodiments, an automatic increase of the speed of the vehicle 100 is performed at point 412 when the user begins to steer out of the cornering maneuver, up to and continuing past the exit point 416 of FIG. 4 in certain embodiments.

With reference back to FIG. 3, in certain embodiments, the process then terminates at step 322.

Accordingly, methods, systems, and vehicles are provided for controlling cruise control functionality for a vehicle, including during cornering maneuvers (e.g., turns) performed by the vehicle. Specifically, in various embodiments, steering angle, steering rate, and other parameters are utilized for automatic adjustment of the speed of the vehicle as part of cruise control functionality for the vehicle during the cornering maneuver, including an initial decrease in speed as the vehicle enters the turn and a subsequent increase in speed to return to the user's manually entered cruise control setting after the user begins to steer out of the cornering maneuver.

It will be appreciated that the systems, vehicles, and methods may vary from those depicted in the Figures and described herein. For example, the vehicle 100 of FIG. 1, the control system 102 thereof, and/or components thereof of FIG. 1 may vary in different embodiments. It will similarly be appreciated that the steps of the process 200 may differ from that depicted in FIGS. 2 and 3, and/or that various steps of the process 200 may occur concurrently and/or in a different order than that depicted in FIGS. 2 and 3. It will similarly be appreciated that the implementation of FIG. 4 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining sensor data via one or more sensors of a vehicle; and adjusting a speed of the vehicle during cruise control by adjusting a cruise control speed setting, by braking, or both, via instructions provided by a processor of the vehicle, as the vehicle performs a cornering maneuver, the adjusting comprising:

automatically, via the processor, decreasing the speed of the vehicle so as to be less than a manually inputted speed for the cruise control set by a driver of the vehicle, during one or more first intervals of the cornering maneuver, both by adjusting a cruise control speed of the vehicle and by automatically braking the vehicle, based on the sensor data and in accordance with the instructions provided by the processor, such that the speed of the vehicle is automatically decreased via the processor by adjusting the cruise control speed of the vehicle and by automatically increasing braking the vehicle after the vehicle passes a first point comprising a braking point for the vehicle as the vehicle approaches the cornering maneuver and until the vehicle reaches an apex of the cornering maneuver and the driver begins to steer the vehicle out of the cornering maneuver;

automatically, via the processor, increasing the speed of the vehicle so as to return to the manually inputted speed for the cruise control, both by further adjusting the cruise control speed of the vehicle and by automatically decreasing braking the vehicle, during one or more second intervals of the cornering maneuver that are subsequent to the one or more first intervals, based on the sensor data and in accordance with the instructions provided by the processor, such that the speed of the vehicle is automatically increased via the processor both by further adjusting the cruise control speed of the vehicle and by automatically decreasing braking the vehicle once the vehicle reaches a second point, the second point comprising the apex of the cornering maneuver at which the driver begins to steer the vehicle out of the cornering maneuver, and until the vehicle reaches a third point comprising an exit point for the turn; and automatically, via the processor, increasing the speed of the vehicle, further after the vehicle reaches the third point comprising the exit point for the turn, wherein the speed of the vehicle is automatically increased by the processor to the manually inputted speed for the cruise control set by the driver for the cruise control;

wherein the decreasing of the speed of the vehicle is performed when the steering rate is within a predetermined steering rate range and the steering angle is greater than a predetermined steering angle threshold, provided further that the cruise control is active for the vehicle.

2. The method of claim 1, wherein:

the sensor data includes steering angle data as to a steering angle of the vehicle; and the decreasing of the speed of the vehicle and the subsequent increasing of the speed during the cornering maneuver are performed based on the steering angle in addition to a steering rate that comprises a rate of change of the steering angle over time.

3. The method of claim 1, wherein the increasing of the speed is performed when one or more of the following conditions are satisfied: (a) the steering rate is no longer within the predetermined steering rate range; or (b) the steering angle is no longer greater than the predetermined steering angle threshold.

4. The method of claim 1, wherein the decreasing of the speed of the vehicle is performed when the steering rate is greater than a first predetermined steering rate threshold and less than a second predetermined threshold, while the steering angle is greater than the predetermined steering angle threshold and the cruise control is active for the vehicle.

5. The method of claim 1, wherein the decreasing of the speed of the vehicle is performed upon an additional condition in which the speed of the vehicle is greater than a predetermined speed threshold.

6. A system comprising:

one or more sensors configured to obtain sensor data as to a vehicle; and a processor that is coupled to the one or more sensors and that is configured to at least facilitate adjusting a speed of the vehicle during cruise control by adjusting a cruise control speed setting, by braking, or both as the vehicle performs a cornering maneuver, the adjusting comprising:

automatically decreasing the speed of the vehicle so as to be less than a manually inputted speed for the cruise control set by a driver of the vehicle, during one or more first intervals of the cornering maneuver, both by adjusting a cruise control speed of the vehicle and by automatically braking the vehicle, such that the speed of the vehicle is automatically decreased via the processor by adjusting the cruise control speed of the vehicle and by automatically increasing braking the vehicle after the vehicle passes a first point comprising a braking point for the vehicle as the vehicle approaches the cornering maneuver and until the vehicle reaches an apex of the cornering maneuver and the driver begins to steer the vehicle out of the cornering maneuver;

automatically increasing the speed of the vehicle so as to return to the manually inputted speed for the cruise control, both by further adjusting the cruise control speed of the vehicle and by automatically decreasing braking the vehicle, during one or more second intervals of the cornering maneuver that are subsequent to the one or more first intervals, based on the sensor data, such that the speed of the vehicle is automatically increased via the processor both by further adjusting the cruise control speed of the vehicle and by automatically decreasing braking the vehicle once the vehicle reaches a second point, the second point comprising the apex of the cornering maneuver at which the driver begins to steer the vehicle out of the cornering maneuver, and until the vehicle reaches a third point comprising an exit point for the turn; and automatically increasing, via the speed of the vehicle, further after the vehicle reaches the third point comprising the exit point for the turn, wherein the speed of the vehicle is automatically increased by the processor to the manually inputted speed for the cruise control set by the driver for the cruise control;

wherein the processor is further configured to at least facilitate performing the decreasing of the speed of the vehicle when the steering rate is within a predetermined steering rate range and the steering angle is greater than a predetermined steering angle threshold, provided further that the cruise control is active for the vehicle.

7. The system of claim 6, wherein:

the one or more sensors comprise one or more steering angle sensors that are configured to obtain steering angle data as to a steering angle of the vehicle; and the processor is further configured to at least facilitate performing the decreasing of the speed of the vehicle and the subsequent increasing of the speed during the cornering maneuver based on the steering angle in addition to a steering rate that comprises a rate of change of the steering angle over time.

8. The system of claim 6, wherein the processor is further configured to at least facilitate performing the increasing of the speed when both of the following conditions are satisfied: (a) the steering rate is no longer within the predetermined steering rate range; or (b) the steering angle is no longer greater than the predetermined steering angle threshold.

9. The system of claim 6, wherein the processor is further configured to at least facilitate performing the decreasing of the speed when the steering rate is greater than a first predetermined steering rate threshold and less than a second predetermined threshold, while the steering angle is greater than the predetermined steering angle threshold and the cruise control is active for the vehicle.

10. The system of claim 7, wherein the processor is further configured to at least facilitate the decreasing of the speed of the vehicle based upon both a lateral acceleration and a comfort score that are determined via the processor using the steering angle and the steering rate.

11. The system of claim 10, wherein:

the one or more sensors further comprise one or more tire pressure sensors that are configured to obtain tire pressure data as to a pressure of one or more tires of the vehicle, and one or more fuel level sensors that are configured to obtain fuel level data as to a fuel level for the vehicle; and the processor is further configured to at least facilitate determining the lateral acceleration or comfort score also using one or more additional conditions that include both the tire pressure of the one or more tires of the vehicle and the fuel level for the vehicle.

12. A vehicle comprising:

a braking system;

a drive system; and a control system for controlling cruise control for the vehicle, the control system comprising:

one or more sensors configured to obtain sensor data as to the vehicle; and a processor that is coupled to the one or more sensors and that is configured to at least facilitate adjusting a speed of the vehicle during the cruise control by adjusting a cruise control speed setting, by braking, or both, as the vehicle performs a cornering maneuver in accordance with instructions provided to the braking system and the drive system, the adjusting comprising:

automatically decreasing the speed of the vehicle so as to be less than a manually inputted speed for the cruise control set by a driver of the vehicle, during one or more first intervals of the cornering maneuver, both by adjusting a cruise control speed of the vehicle and by automatically braking the vehicle, such that the speed of the vehicle is automatically decreased via the processor by adjusting the cruise control speed of the vehicle and by automatically increasing braking the vehicle after the vehicle passes a first point comprising a braking point for the vehicle as the vehicle approaches the cornering maneuver and until the vehicle reaches an apex of the cornering maneuver and the driver begins to steer the vehicle out of the cornering maneuver;

automatically increasing the speed of the vehicle so as to return to the manually inputted speed for the cruise control, both by further adjusting the cruise control speed of the vehicle and by automatically decreasing braking the vehicle, during one or more second intervals of the cornering maneuver that are subsequent to the one or more first intervals, based on the sensor data, such that the speed of the vehicle is automatically increased via the processor both by further adjusting the cruise control speed of the vehicle and by automatically decreasing braking the vehicle once the vehicle reaches a second point, the second point comprising the apex of the cornering maneuver at which the driver begins to steer the vehicle out of the cornering maneuver, and until the vehicle reaches a third point comprising an exit point for the turn; and automatically increasing, via the speed of the vehicle, further after the vehicle reaches the third point comprising the exit point for the turn, wherein the speed of the vehicle is automatically increased by the processor to the manually inputted speed for the cruise control set by the driver for the cruise control;

wherein the processor is further configured to at least facilitate performing the decreasing of the speed of the vehicle when the steering rate is within a predetermined steering rate range and the steering angle is greater than a predetermined steering angle threshold, provided further that the cruise control is active for the vehicle.

13. The method of claim 1, wherein the adjusting of the speed of the vehicle comprises both a speed adjustment and a temporal length of the adjusting of the speed.

14. The method of claim 1, wherein the decreasing of the speed is based on lateral acceleration of the vehicle in addition to additional parameters, including each of the following: steering angle, steering rate, known vehicle characteristics, tire pressure, and a fuel level of a fuel tank of the vehicle.

15. The method of claim 1, wherein the decreasing of the speed comprises automatically decreasing the speed of the vehicle, via the processor, a certain magnitude and amount of time that is based at least in part on a lateral acceleration of the vehicle, such that the speed is automatically reduced by an amount that will keep the lateral acceleration below a predetermined threshold during the cornering maneuver.

16. The method of claim 15, wherein the decreasing of the speed further comprises automatically decreasing the speed of the vehicle, via the processor, the certain magnitude and amount of time that is based also at least in part on a comfort score of the driver that is based on the lateral acceleration, and specifically that optimizes the comfort score during the cornering maneuver and that maintains the comfort score at a predetermined level during the cornering maneuver.

17. The method of claim 2, wherein:

the decreasing of the speed of the vehicle is performed when the steering rate is within a predetermined steering range, specifically, when the steering rate is greater than a first predetermined steering rate threshold and less than a second predetermined steering rate threshold, while the steering angle is greater than the predetermined steering angle threshold and the cruise control is active for the vehicle;

the increasing of the speed is performed when the steering rate is no longer within the predetermined steering rate range; and the decreasing of the speed of the vehicle is performed upon an additional condition in which the speed of the vehicle is greater than a predetermined speed threshold.

18. The method of claim 17, wherein:

the first predetermined steering rate threshold is equal to two and a half degrees per second;

the second predetermined steering rate threshold is equal to twenty degrees per second; and predetermined speed threshold is equal to fifty miles per hour.

* * * * *